United States Patent [19]

Konersmann

[11] Patent Number: 4,467,567
[45] Date of Patent: Aug. 28, 1984

[54] METHOD OF CROWN GRINDING GEARS HAVING LENGTHWISE CURVED TEETH

[75] Inventor: Erhard Konersmann, Wallisellen, Switzerland

[73] Assignee: Werkzeugmaschinenfabrik Oerlikon-Bührle AG, Zurich, Switzerland

[21] Appl. No.: 385,895

[22] Filed: Jun. 7, 1982

Related U.S. Application Data

[63] Continuation of Ser. No. 162,389, Jun. 23, 1980, abandoned.

[30] Foreign Application Priority Data

Jul. 12, 1979 [CH] Switzerland .......................... 6503/79

[51] Int. Cl.³ .............................................. B24B 1/00
[52] U.S. Cl. .......................................... 51/287; 51/90
[58] Field of Search ............... 51/90, 287, 95 GA; 409/61, 25; 407/21

[56] References Cited

U.S. PATENT DOCUMENTS

| | | | |
|---|---|---|---|
| 1,310,761 | 7/1919 | McCracken | 409/25 |
| 2,248,158 | 7/1941 | Boor | 409/25 |
| 2,978,964 | 4/1961 | Wildhaber | 409/25 |
| 3,440,927 | 4/1969 | Snook | 409/61 |
| 3,492,916 | 2/1970 | Lantrell | 409/25 |
| 3,503,301 | 3/1970 | Cautrell | 409/25 |
| 3,760,476 | 9/1973 | Kotthaus | 407/21 |
| 4,183,703 | 1/1980 | Kotthaus | 409/25 |

FOREIGN PATENT DOCUMENTS

543921 12/1973 Switzerland .......................... 51/90

*Primary Examiner*—Harold D. Whitehead
*Attorney, Agent, or Firm*—Werner W. Kleeman

[57] ABSTRACT

A method for crown grinding of gear teeth having lengthwise curved teeth and a grinding head for the performance of the method, wherein there are ground the outer and inner flanks by means of rotatable, individually driven grinding elements or bodies, which are mounted in a grinding head rotatable about an axis of rotation and, during grinding, forming an outer as well as an inner envelope surface which is coaxial with respect to the axis of rotation of the grinding head. In order to be able to crown grind teeth flanks with greater accuracy, the axis of rotation of the grinding head is adjusted in spaced relation from a computation point of a tooth lengthwise line of the tooth flank, which is different from the spacing of the computation point of the tooth lengthwise line from a center serving as the center for non-crowned tooth flanks.

4 Claims, 4 Drawing Figures

METHOD OF CROWN GRINDING GEARS HAVING LENGTHWISE CURVED TEETH

CROSS-REFERENCE TO RELATED APPLICATION

This application is a continuation application of my commonly assigned, copending U.S. application Ser. No. 06/162,389, filed June 23, 1980, now abandoned.

BACKGROUND OF THE INVENTION

The present invention relates to a new and improved method for the crown grinding of gear teeth having lengthwise curved teeth, by means of truncated conical-shaped grinding elements or bodies which are individually driven and rotatable about their axes. The grinding elements are mounted in a grinding head rotatable about an axis of rotation and, during grinding, form an outer as well as an inner envelope surface which is coaxially dispositioned with respect to the axis of rotation of the grinding head. The invention further pertains to an improved grinding head for performance of the aforesaid method.

Lengthwise curved teeth of gears are crown ground, in order to exactly define to the extent possible the region of the teeth flanks where there occurs contact with the teeth of a mating gear, the so-called load bearing. In this way, there can be avoided, for instance, one sided load-bearing or load-bearing limited only to the ends of the gear teeth.

Swiss Pat. No. 543,921, discloses a method for grinding and crown grinding of gears, and also an apparatus for the performance of a method of the type generally discussed hereinabove. The grinding of the inner and outer flanks of the gear teeth is accomplished, with this method, simultaneously during one working operation. A grinding head, used for this purpose, contains two groups of truncated cone-shaped grinding elements or bodies. Each group is arranged upon a circle which is concentrically dispositioned with respect to the axis of rotation of the grinding head. In order to perform the grinding operation, a tooth is moved in each instance between a pair of mutually operatively correlated grinding elements or bodies, each such grinding elements or bodies being correlated to a respective one of both groups. With this technique, the grinding elements or bodies rotate about their own axes as well as about the axis of the grinding head.

For crown grinding, the grinding elements are mounted to be movable to-and-fro in the direction of their axes upon the grinding head. This to-and-fro movement is controlled in that the ends of the grinding elements, facing away from the gear to be ground, are guided along ring-shaped control cams or discs, which during rotation of the grinding head, initiates such to-and-fro movements. In other words, the tooth flanks are ground at their ends closer to the tooth root or base of the tooth gap, and the truncated cone-shaped grinding elements grind more intensely also perpendicular to the tooth flanks.

With this technique and this grinding head, the grinding accuracy is impaired by the following explained drawbacks.

Since the ends of the grinding elements or bodies slide upon the control cam or disc transversely with respect to their own axis, during the rotation of the grinding head, the grinding elements and, in particular, their cylindrical shafts or stems, are placed into oscillation. This is so because the mounting of the individual grinding elements cannot be accomplished in a stable manner, as such would be desirable, since very little space is available between the individual grinding elements or bodies in order to provide an effective mounting or support arrangement.

After the dressing of the grinding elements, the spacing between the grinding elements of a pair, as well as the spacing of the individual grinding elements from the axis of rotation of the grinding head, again must be newly adjusted. Since a grinding head contains a large number of pairs of such grinding elements, there must be carried out a corresponding number of adjustments, increasing the probability of faulty settings.

Furthermore, there is known to the art from U.S. Pat. No. 3,440,927 a machine for cutting gears. With this equipment, the inner and outer flanks of the gear teeth are cut with cutters or cutting blades arranged at different radii upon a cutter head. Here, the inner and outer flanks are cut in separate working operations, and the axis of rotation of the cutter head is set in spaced relationship from the related teeth flanks, such spacing corresponding to the radius of the cutter at the cutter head.

This cutting technique is, however, not comparable to the inventive cutting method for crown cutting of gear teeth since the prior art cutting method is applicable to cone gears, and, specifically, serves for tapering the teeth for the teeth gap or spaces in their lengthwise direction.

Other prior art techniques and equipment for cutting gears are demonstrated in U.S. Pat. No. 3,503,301 and German patent publication No. 1,752,775.

SUMMARY OF THE INVENTION

It is a primary object of the present invention to provide a new and improved method of crown grinding gears having lengthwise curved teeth and a grinding head for the performance of such method, wherein the aforementioned limitations and drawbacks can be effectively overcome.

Another more specific object of the present invention aims at providing a new and improved method for the crown grinding of gears having lengthwise curved teeth and a new and improved construction of grinding head for the performance of such method, wherein it is possible to carry out the machining work with increased accuracy, and furthermore, there is facilitated the reproducibility of the thus formed teeth flanks.

Now in order to implement these and still further objects of the present invention, which will become more readily apparent as the description proceeds, the method aspects of the present development are manifested by the features that the axis of rotation of the grinding head is set at a spacing from a computation point of a tooth lengthwise line of a tooth flank, which spacing is different from the spacing of the computation point of the tooth lengthwise line to a center serving as the center for non-crowned tooth flanks.

As mentioned previously, the invention is also concerned with a grinding head for the performance of the aforesaid method aspects, this grinding head being manifested by the features that there are provided a single group of grinding elements, whose axes are arranged upon a single circle.

The advantages which can be obtained with the invention essentially reside in the fact that, the dressing operation is appreciably simplified since the grinding elements for crown grinding the inner and outer flanks of the teeth can be dressed during separate dressing operations. Thereafter, the relevant teeth flanks are ground, before dressing is again accomplished in order to grind the other teeth flanks. Moreover, the grinding head can be designed such that it can be employed for the crown grinding of gears in a large module range.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
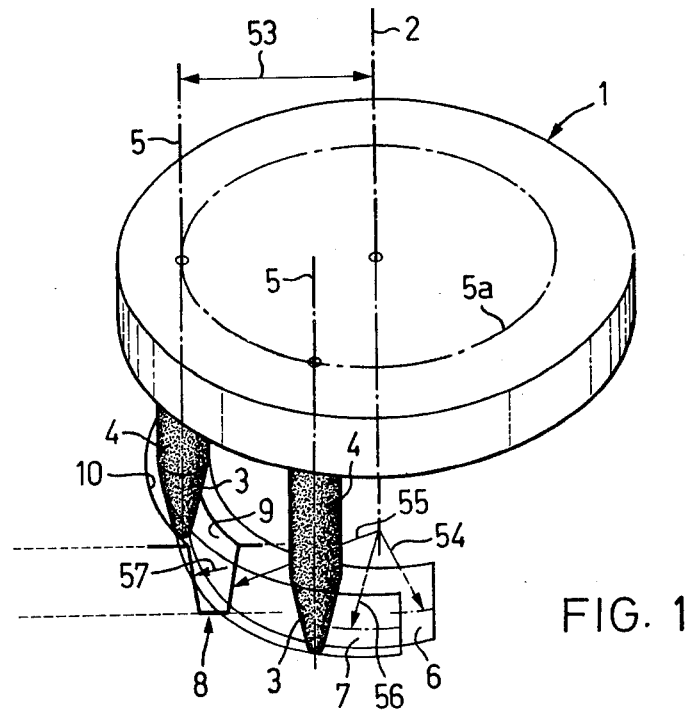
FIG. 1 illustrates in perspective view a grinding head according to the invention and useful for the practice of the inventive method aspects.

Describing now the drawings, in FIG. 1 there is schematically illustrated an exemplary embodiment of a grinding head 1. This grinding head 1 can be inserted, for instance, into a not particularly illustrated, but conventional tool spindle of a machine, in the manner known to the art from Swiss Pat. No. 543,921, to which reference may be readily had. When so mounted, the grinding head 1 is rotatable about an axis of rotation 2. In the grinding head 1 there are rotatably mounted truncated conical-shaped grinding elements or bodies 3 by means of their cylindrical shafts or stems 4 for rotation about their lengthwise axes 5. The grinding elements 3 rotate during grinding at a high rotational speed about their own lengthwise axes 5. The drive and mounting of such grinding elements or bodies 3 is well known and described, for instance, in the aforementioned Swiss Pat. No. 543,921, and inasmuch as the same does not constitute subject matter of the present invention, such need not here be further considered. This grinding head 1 contains a number of such grinding elements 3, whose axes 5 are located along a circle 5a which, in the perspective illustration of FIG. 1, appears as an ellipse. The grinding, truncated cone-shaped surfaces of the grinding elements 3, during their rotation about their axes 5, as well as about the axis of rotation 2, carry out movements which are enveloped by an inner envelope surface 6 and an outer envelope surface 7.

Furthermore, FIG. 1 illustrates a tooth space or gap 8 with an outer flank 9 of a neighboring gear tooth and an inner flank 10 of a further neighboring gear tooth. The designation outer flank and inner flank relate specifically to lengthwise curved gear teeth, whose inwardly curved flanks are designated as the inner or internal flanks and whose outer curved flanks are designated as the outer or external flanks. FIG. 1 illustrates a grinding element or body 3 just in that position where there is ground the outer flank 9. The tooth space or gap 8, as shown in FIG. 1, can be conceptually construed both as the tooth gap of a spur gear or also as the tooth gap of a crown gear.

Figure 2:
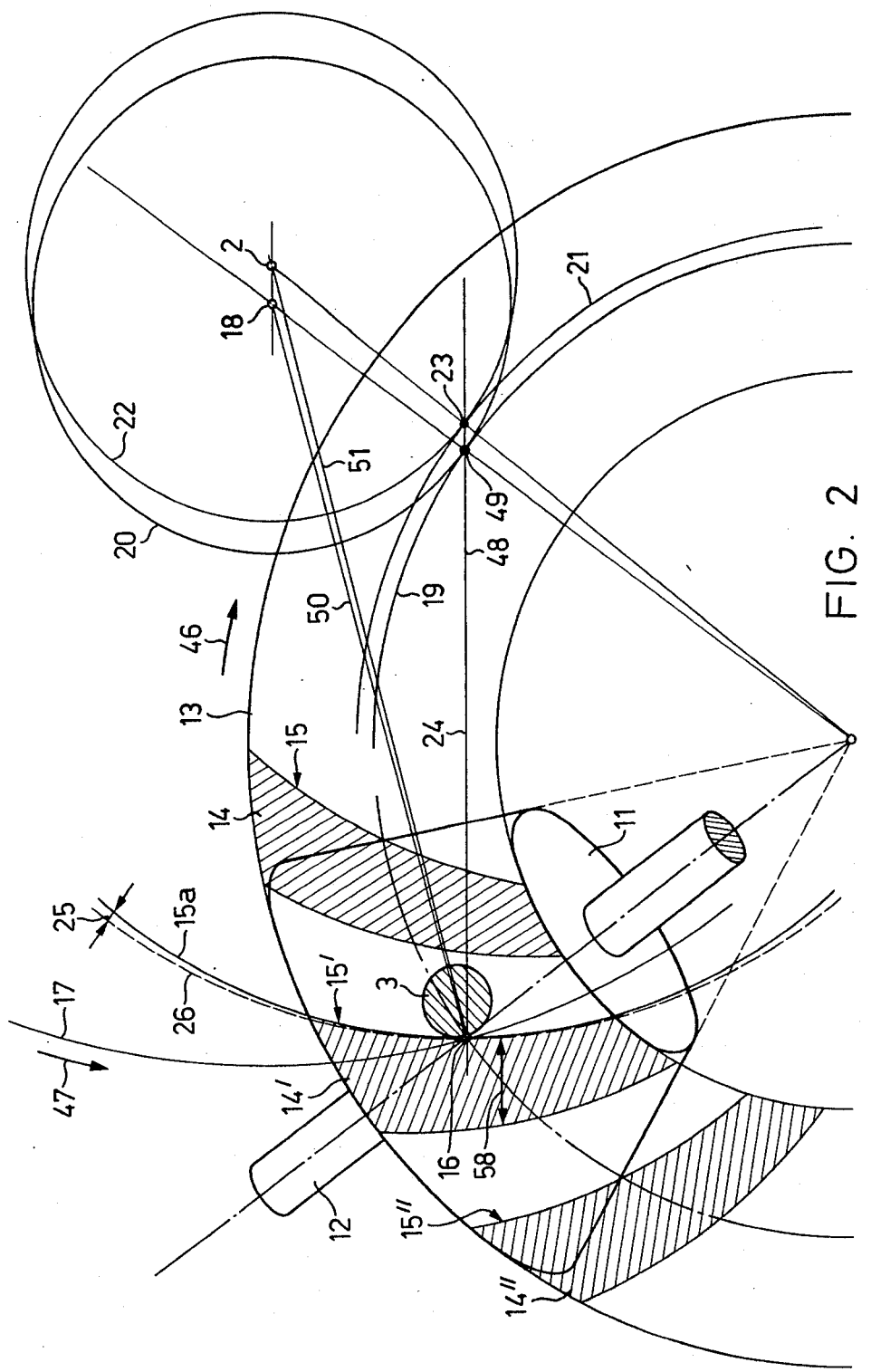
FIG. 2 is a schematic illustration of the geometric conditions prevailing during the performance of the method for cutting an inner flank of a tooth of a gear.

In FIG. 2 there will be recognized a bevel gear 11 which is attached to a workpiece spindle 12. This workpiece spindle 12 can constitute part of a machine, for instance of the type disclosed in the aforementioned Swiss Pat. No. 543,921. Further, there will be recognized from the illustration of FIG. 2, an imaginary crown gear 13 having the gear teeth 14, 14', 14", which has been shown in sectional view at the region of the pitch plane of the crown gear 13. A tooth lengthwise line 15a of an inner flank 15' of the unground gear tooth 14', at the region of a computation point 16, is identical with the tooth lengthwise line of the corresponding actual tooth of the bevel gear 11. Since the actual lengthwise wise curved tooth of the bevel gear 11, following the cone shell, does not extend parallel to a cone shell line, the teeth 14, 14', 14" (also in FIG. 3), cut in the pitch plane, constitute the actual teeth of the bevel gear 11 at developments projected upon the pitch plane of the imaginary crown gear 13. The teeth 14, 14', 14", 28 of the crown gear 13 have been shown with exaggerated dimensions in FIGS. 2 and 3 in relation to the diameter of the bevel gear 11. A grinding element 3 has also likewise here been shown in sectional view at the pitch plane of the crown gear 13. The envelope surface 7, according to the showing of FIG. 1, has been illustrated in FIG. 2, cut in the pitch plane of the crown gear 13 and therefore corresponds to the arc 17.

Figure 4:
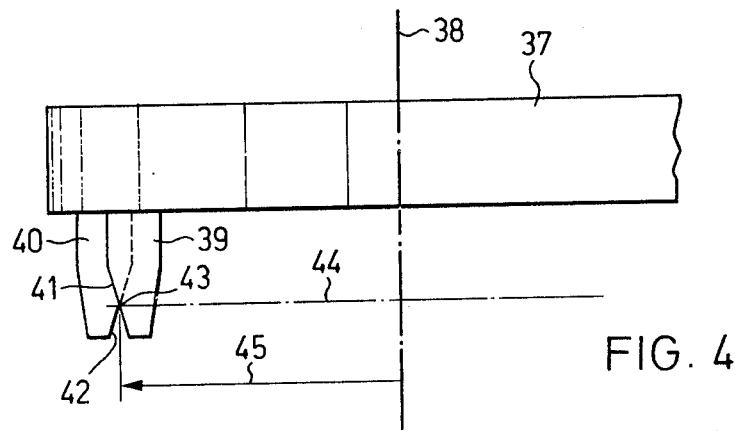
FIG. 4 is a side view of a cutter head.

The teeth 14, 14', 14" of the crown gear 13 and the bevel gear 11, respectively, in the embodiment under discussion, are fabricated by means of a rotating cutter head 37 as best seen by referring to FIG. 4, in accordance with a continuous cutting technique. An axis of rotation 38 of the cutter head 37 intersects the pitch circle plane of the crown gear 13 at a center 18. Equally of significance are the base circle 19 and pitch circle 20 which contact at a point 49, during cutting of the teeth 14, 14', 14". Since during crown cutting, the grinding head 1 is rotated about the axis of rotation 2, there is then accordingly of importance a base circle 21 and a pitch circle 22. The base circle 21 and pitch circle 22 contact at a point 23. Between this point 23 and the computation point 16 there is located a momentary radius of curvature 24 of a crowned lengthwise line 26. A lengthwise crown 25, i.e., the dimension through which the original tooth lengthwise line 15a at the ends of the tooth 14' deviates from the crown lengthwise line 26, is extremely small in comparison to the width 58 of the gear tooth 14'. The lengthwise lines 15a and 26 therefore have been drawn somewhat further towards the outside in the showing of FIG. 2, in order to render visible the lengthwise crown 25 of the gear teeth.

Figure 3:
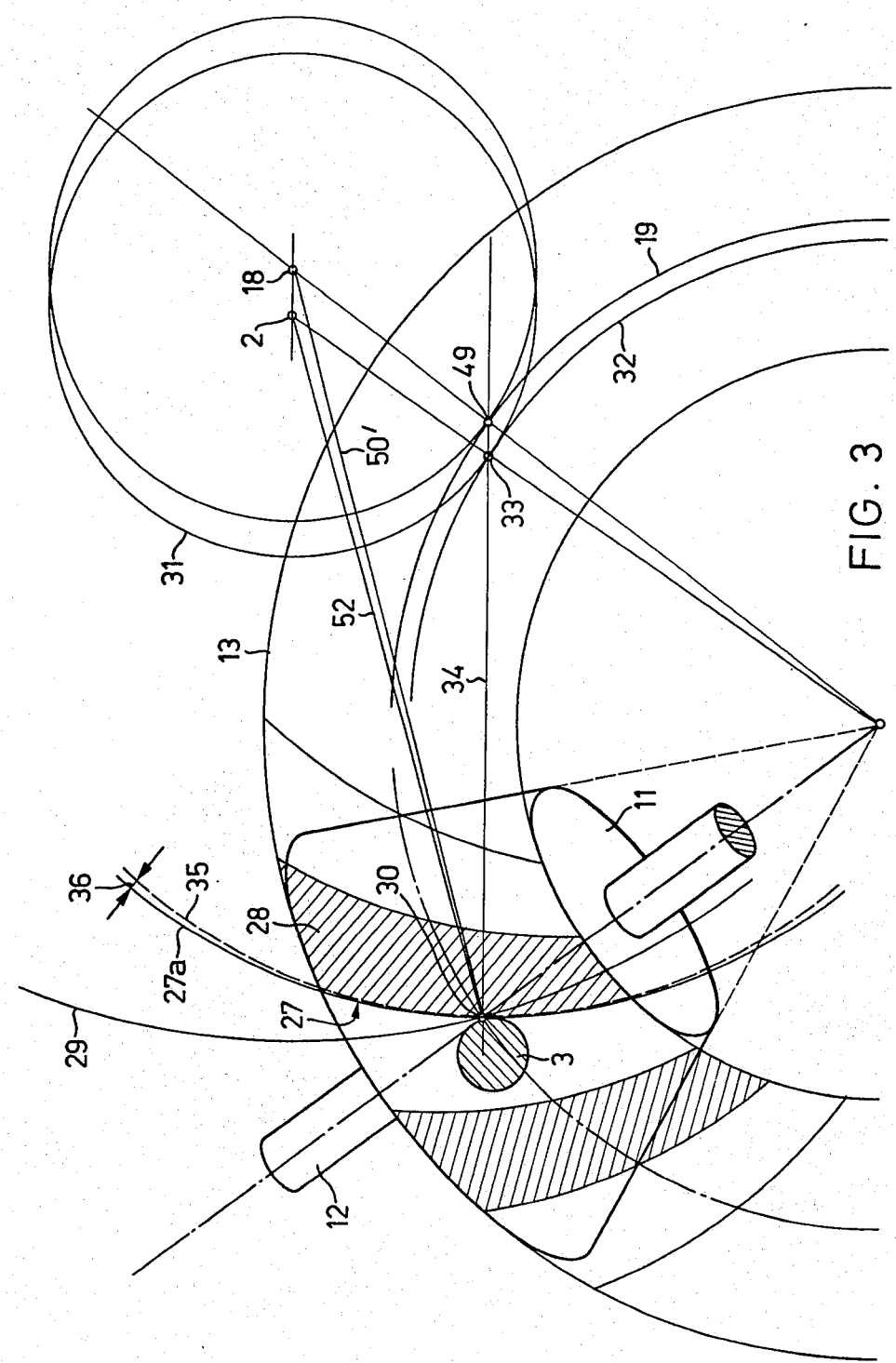
FIG. 3 is a schematic illustration, corresponding to the showing of FIG. 2, but this time for cutting an outer or external flank of a tooth of a gear.

FIG. 3 shows an arrangement, analogous to that of FIG. 2, wherein however, the grinding elemetn 3 should grind an outer tooth flank 27, here apparent in sectional view with the pitch plane of the crown gear 13 as the lengthwise line 27a of a tooth 28. The inner envelope surface 6 according to FIG. 1, cut by the pitch plane of the crown gear 13, has been illustrated as an arc 29, which intersects the lengthwise line 27a at a computation point 30 of the outer flank 27. The axis of rotation 2 constitutes the center of a pitch circle 31 which contacts a base circle 32 at a point 33. A momentary radius of curvature 34 of a crown lengthwise line 35 of the crown or crowned tooth flank 27 extends between the point 33 and the computation point 30. A lengthwise crown 36, in this case, appears between the lengthwise longitudinal lines 27a and 35.

FIG. 4 illustrates a cutter head 37, as the same can be employed, for instance, for fabricating the teeth of a bevel gear 11 according to a continuous gear cutting technique. Such type cutter head 37 may be of the type disclosed, closed, for instance, in U.S. Pat. No. 3,218,931 and U.S. Pat. No. 3,760,476. There are illustrated the axis of rotation 38 of the gear cutter 37, an inner cutter 40, and an outer cutter 39. The cutting edges 41 and 42 are directed in conventional manner such that at the cutting point 43 these cutter or cutting edges 41 and 42 have, in relation to a pitch plane 44, a respective similar radius.

Having now had the benefit of the foregoing description of the inventive apparatus, there will be explained its mode of operation which is as follows:

Based upon the illustration of FIG. 1, there will be now explained the manner in which there can be crown ground the inner and outer tooth flanks 10, 9 of the gear teeth of a gear with an individual indexing method. There initially are crown ground, for instance, all of the outer tooth flanks 9, thereafter all of the inner tooth flanks 10.

For crown grinding of the outer flanks 9, there is used a grinder head 1 of the type previously described, whose inner envelope surface 6 possesses a slightly smaller radius of curvature 54 than the radius of curvature 55 of the unground outer tooth flank 9. There is adjusted the relative position of the grinding head 1 and the outer flank 9, in that the axis of rotation 2 of the grinding head 1 is brought into position where it is located at the same respective distance from both ends of the outer flank 9, and thus, the grinding element 3 can contact the center of the outer tooth flank 9. In order to be able to grind further outer tooth flanks 9, it is then necessary to further rotate the gear in each case through one gear tooth division, so that an unground outer flank 9 now is positioned at the location of the crown ground outer flank 9. For the crown grinding, there is then switched-on the drive for the grinding element or body 3 and also the drive for the grinding head 1. Hence, the grinding element 3 rotates at increased velocity about its own axis 5 as well as conjointly at a lower velocity about the axis of rotation 2. By virtue of the previously explained differences of the radii of curvature 54, 55 of the envelope surface 6 as well as the outer flank 9, a more intensified grinding operation occurs towards both ends of the outer tooth flanks 9, as also readily evident from a comparison of the lengthwise lines 27a, 35 of the gear tooth 28 in the embodiment of FIG. 3. The feed or advance movement during the grinding operation, occurs by slightly rotating the gear towards the grinding element or body 3. Analogous operations are carried out during the crown grinding of the inner tooth flanks 10. To this end, there is selected a grinding head 1 whose outer envelope surface 7 has a slightly larger radius of curvature 56 than the radius of curvature 57 of the inner tooth flank 10. In all other respects, the procedures are the same as already explained during the crown grinding of the outer tooth flanks 9.

On the other hand, if during the setting of the axis of rotation 2 of the grinding head 1 relative to the outer flank 9 or inner flank 10, as the case may be, the rotational axis 2 is adjusted such that it no longer in each case is at the same spacing from the ends of the outer tooth flank 9 or inner tooth flank 10, then a more intensified grinding occurs at the end of the outer flank 9 or inner flank 10 which is located further from or closer to the axis of rotation 2, as the case may be. In corresponding manner, at the other end of the same tooth flank, there is ground less or not at all. In this way it is possible to shift the load-bearing profile or image of a tooth flank in its lengthwise direction.

Additionally, it is further to be remarked that for crown grinding the inner and outer tooth flanks 10, 9 of a gear, there usually can be employed the same grinding head 1 with the same grinding elements or bodies 3. In order to obtain a high grinding efficiency, the diameter of the grinding element 3 should be as large as possible, but of course somewhat smaller than the width of the tooth space or gap 8. The outer envelope surface 7 has a radius of curvature 56 which is greater than the radius of curvature 54 of the inner envelope surface 6. Since frequently, in the case of gears, the radii of curvature of the inner flanks 10 and the outer flanks 9, following the grinding operation, are the same or only slightly different, there prevails at the same grinding head 1 the prerequisite wherein, for crown grinding, the radius of curvature 56 of the outer envelope surface 7 must be greater than the radius of curvature 57 of the inner flank 10 and the radius of curvature 54 of the inner envelope surface 6 must be smaller than the radius of curvature 55 of the outer flank 9, which prerequisite is then fulfilled if the radii of curvature 55, 57, of the unground flanks are between the radii of curvature 54, 56 of both envelope surfaces 6, 7.

Based upon the showing of FIGS. 2 and 3, there will now be explained the manner in which the inner and outer flanks of the teeth of a gear, for instance a bevel gear are crown ground by means of a continuous grinding process. A prerequisite for this grinding technique is that the tooth spaces or gaps have already been cut in accordance with the same continuous machining process. As to such process, reference will be made thereto in conjunction with FIG. 2. It will be seen that the inner flanks of the gear teeth have been fabricated by means of cutting edges 41 of the outer cutters 39 of the cutter head 37 (FIG. 4). FIG. 2 illustrates the conditions as the same arise at the pitch plane of the crown gear 13. Thus, the crown gear 13, during such time as it rotates in the direction of the arrow 46, meshes with the likewise rotating bevel gear 11. The cutter head 37 rotates about its axis of rotation 38, intersecting the pitch plane at the center 18, in the direction of the arrow 47, whereby the cutting edge 41 generates the tooth lengthwise line 15a of the tooth 14' of the crown gear 13. The cutter head 37 and bevel gear 11 rotate at velocities which are governed by the rolling of the pitch circle 20 of the cutter head 37 upon the base circle 19 of the crown gear 13, and its contact always occurs at the point 49. Since, in the embodiment under discussion, the radii 45 (FIG. 4), for both of the cutting edges 41 and 42 of the inner and outer cutters or cutter blades 40 and 39 respectively, in the pitch plane 44, which coincides with the pitch plane (plane of the drawing) of the crown gear 13, are the same, all of the tooth lengthwise lines 15a, 27a of all teeth of the crown gear 13 and the bevel gear 11, respectively, have the same radius of curvature. Such corresponds, for the computation point 16, to the distance 48 between the computation point 16 and the contact point 49 of the base circle 19 with the pitch circle 20. However, the radius 45 corresponds to the spacing 50 between the computation point 16 and the center 18. The circumstance that the spacing 50, corresponding to the radius 45, at the cutter head 37, in FIG. 2 is greater than the momentary radius of curvature, corresponding to the spacing or distance 48, is a characteristic of this continuous fabrication process and likewise occurs during crown grinding according to this technique. This is so because during cutting or grinding the gear and the cutter head or the grinding head, as the case may be, each carry out a rotational movement. However, this is well-known and therefore need not here be further discussed.

For the crown grinding of the inner flank 15' of the gear tooth 14' there is now employed a grinding head 1, whose radius of curvature 56 of the outer envelope surface 7, which in the showing of FIG. 2, corresponds to a distance 51 between the computation point 16 and the axis of rotation 2, is greater than the distance or spacing 50 and the radius 45 of the cutter head 37. In corresponding manner, the axis of rotation 2 of the grinding head 1 must be mounted at a greater distance 51 from the computation point 16 of the tooth lengthwise line 15a. The pitch circle 21 and base circle 22 now contact one another at a point 23, located at a greater distance 24 from the computation point 16 than the point 49. Hence, there is realized a greater radius of curvature, corresponding to the distance or spacing 24 for the crown lengthwise line 26 of the tooth 14'.

For the crown grinding of the outer flank 27 (FIG. 3) of the tooth 28 there is employed a grinding head 1 whose radius of curvature 54 of the inner envelope 6, which in the showing of FIG. 3 corresponds to a distance or spacing 52 between the computation point 30 and the axis of rotation 2 of the grinding head 1 is smaller than the distance 50' between the computation point 30 and the center 18 or radius 45 of the cutter head 37 (FIG. 4). In corresponding manner, the axis of rotation 2 of the grinding head 1 must be mounted at a smaller spacing 52 from the computation point 30 of the tooth lengthwise line 27a. The pitch circle 31 and base circle 32 now contact one another at a point 33, located at a smaller distance 34 from the computation point 30 than the point 49 (see also FIG. 2). Hence, there results a smaller radius of curvature, corresponding to the distance 34 for the crown lengthwise line 35 of the gear tooth 28.

In the embodiment according to the showing of FIGS. 2 and 3, it is possible to likewise employ the same grinding head 1 for crown grinding the inner and also the outer flanks 15, 15', 15'', 27. This is particularly then the case if there is assumed an axial spacing 53 (FIG. 1) between the axis of rotation 2 of the grinding head 1 and the axes 5 of the grinding elements or bodies 3 which is equal to the radius 45 (FIG. 4) of the cutting edges 41, 42 at the pitch plane 44. The radius of curvature 56 and 54 (FIG. 1) of the outer envelope surface 7 and the inner envelope surface 6, respectively, is therefore greater and smaller than the radius 45 (FIG. 4) of the cutting edges 41 and 42, by means of which there are produced the lengthwise lines 15a and 27a, respectively, (FIGS. 2 and 3) of the teeth 14, 14', 14'', and 28.

The center 18, with the inventive grinding technique, serves as the center for the lengthwise lines of non-crowned tooth flanks in the same sense as it can constitute the curvature center and also the center of the movement of a tool, which in conjunction with the momentary movement of the gear or crown gear, produces a non-crowned, tooth lengthwise line.

Of course, the inventive grinding technique is not limited to gears which are fabricated according to an individual indexing method or by means of a generating crown gear. The grinding method of the invention can also be employed for gears which are fabricated with a generating cutter gear or according to a milling or casting process. Equally, the gear teeth which are to be crown ground according to the inventive method and with the inventive grinding head also can be generated.

While there are shown and described present preferred embodiments of the invention, it is to be distinctly understood that the invention is not limited thereto, but may be otherwise variously embodied and practiced within the scope the following claims. ACCORDINGLY,

What I claim is:

1. A method of crown grinding gears having lengthwise curved teeth, comprising the steps of:
    providing substantially truncated cone-shaped, individually driven grinding elements rotatable about their lengthwise axes;
    mounting said grinding elements in a grinding head rotatable about an axis of rotation in such a manner that all axes of said grinding elements are arranged on a single circle about the axis of rotation and are axially and radially fixed;
    setting the axis of rotation of the grinding head and the radius of the single circle in such a manner that the lengthwise axes of the grinding elements, during rotation of the grinding head, describe paths which at the region of the gear which is to be ground extend substantially parallel to lengthwise lines of the unground tooth flanks;
    grinding one tooth flank of a tooth gap with the grinding head;
    displacing the axis of rotation of the grinding head and adjusting such with respect to the other tooth flank of the tooth gap; and
    thereafter grinding the other tooth flank of the tooth gap with the grinding head, while the lengthwise axes of the grinding elements remain set at the same circle as during the grinding of the one tooth flank.

2. The method as defined as claim 1, further including the steps of:
    dressing the grinding elements at an inner envelope surface thereof prior to grinding the outer flanks of the teeth; and
    dressing the grinding elements at an outer envelope surface thereof prior to grinding the inner flanks of the teeth.

3. A method of crown grinding gears having lengthwise curved teeth, comprising the steps of:
    providing substantially truncated cone-shaped, individually driven grinding elements rotatable about their lengthwise axes;
    mounting said grinding elements in a grinding head rotatable about an axis of rotation in such a manner that all axes of said grinding elements are arranged on a single circle about the axis of rotation and are axially and radially fixed;
    setting the axis of rotation of the grinding head and the radius of the single circle in such a manner that the lengthwise axes of the grinding elements, during a coupled rotational movement of the grinding head and the gear which is to be ground, describe relative to one another substantially cycloidal-shaped paths which, at the region of the tooth flanks to be ground, extend essentially parallel to substantially cycloidal-shaped curved lengthwise lines of the unground toothed flanks;
    grinding one tooth flank of a tooth gap with the grinding head with the gear rotating;

displacing the axis of rotation of the grinding head and adjusting such with respect to the other tooth flank of the tooth gap; and thereafter grinding the other tooth flank of the tooth gap with the grinding head with rotating gear, while the lengthwise axis of the grinding elements remain set at the same circle as during the grinding of the one tooth flank.

4. The method as defined as claim 3, further including the steps of:

dressing the grinding elements at an inner envelope surface thereof prior to grinding the outer flanks of the teeth; and dressing the grinding elements at an outer envelope surface thereof prior to grinding the inner flanks of the teeth.

* * * * *